United States Patent [19]

Vasishth et al.

[11] 4,432,797

[45] Feb. 21, 1984

[54] WATER BASED THICKENED STAIN

[75] Inventors: Ramesh C. Vasishth, Danville; Robert S. Wang, Concord, both of Calif.

[73] Assignee: Envirosol Systems International, Ltd., Orinda, Calif.

[21] Appl. No.: 357,033

[22] Filed: Mar. 11, 1982

[51] Int. Cl.$^3$ .................. B05D 3/02; C09D 15/00
[52] U.S. Cl. ...................... 106/34; 106/3; 106/138; 106/143; 106/163 R; 427/393; 524/25; 524/26; 524/28; 524/513; 524/556; 524/601
[58] Field of Search .............. 106/3, 34, 138, 143, 106/163 R; 8/402; 524/513, 25, 26, 28, 556, 601; 427/393

[56] References Cited

U.S. PATENT DOCUMENTS

| | | | |
|---|---|---|---|
| 1,896,662 | 2/1933 | Brodeur | 106/34 |
| 3,023,177 | 2/1962 | Boucher | 524/513 |
| 3,663,261 | 5/1972 | Miettinen et al. | 523/300 |
| 3,758,641 | 9/1973 | Zweigle | 427/440 |
| 3,992,343 | 11/1976 | Haschke et al. | 524/556 |
| 4,187,072 | 2/1980 | Fernandez | 8/402 |
| 4,240,939 | 12/1980 | Kostic | 106/26 |
| 4,276,329 | 6/1981 | Vasishth et al. | 427/393 |
| 4,285,997 | 8/1981 | Vasishth et al. | 427/393 |
| 4,289,678 | 9/1981 | Calder et al. | 524/556 |

FOREIGN PATENT DOCUMENTS 676431 7/1952 United Kingdom .................. 8/402

OTHER PUBLICATIONS

"JK 270", Lorcon Chemicals Inc., Harrisons & Crossfield, (Pacific) Inc.
"JK 270 Water-Based Resin", Resins Division, Lorcon Chemicals Inc.
"Tamol Dispersants", Trade Sales Coatings, *Polymers, Resins and Monomers,* Rohm and Haas Company, Dec. 1978.
"Arothix C301-M-60", *Technical Data,* TD-7542, Nov. 7, 1980.
"A Practical Guide to Rheological Additives", *NL Rheology Handbook,* NL Industries, Inc.
"NL Rheological Additive Selection Chart", NL Industries, Inc.
"Natrosol Hydroxyethyl Cellulose, Controls Flow Properties of Latex Paints", Hercules Inc., Oct. 1971.
"Experimental Thickener QR-708, (Preliminary Notes)", Rohm and Haas Company.
"Thickener CPE-15", Additives, *Polymers, Resins and Monomers,* Rohm and Haas Company, Oct. 1981.
"Acrysol WS-24 Acrylic Copolymer Dispersion Resin", Industrial Coatings, *Polymers, Resins and Monomers,* Rohm and Haas Company, 1977.
"Rhoplex B-505/711, Acrylic Copolymer for Detergent Resistant Clear Floor Polishes", Rohm and Haas Company.

*Primary Examiner*—Ronald W. Griffin
*Attorney, Agent, or Firm*—Townsend and Townsend

[57] ABSTRACT

A water borne wood stain resistant to pigment settling prior to use. A preferred formulation contains the following components in approximate parts by weight:

| Component | Amount |
|---|---|
| Film forming resin | 5–8 |
| Pigment | 5–15 |
| Water thickener | 0.5–2 |
| Water | 89.5–75 |

10 Claims, No Drawings

WATER BASED THICKENED STAIN

BACKGROUND OF THE INVENTION

1. Field of the Invention

This invention relates to wood stains and their use on bare wood. More particularly, it relates to water borne wood stains having an elevated viscosity for deterring settlement of the pigment in the stain prior to use of the composition.

2. Brief Description of the Prior Art

Stains that can be used to enhance the grain structure or change the color of the wood or both have been used for years. They generally consist of a pigment, a binder such as an alkyd resin containing a drier, and organic solvents such as mineral spirits, VMP naphtha, kerosene, xylene, toluene or a mixture of these. The pigment in such stains tends to settle and the entire mixture needs prolonged stirring prior to use to obtain a uniform suspension of the pigment in the solvent phase.

To avoid pigment settling, in the last two decades modified alkyds, commonly called gelled alkyds, that give a very high viscosity have been used. An example of such an alkyd is Arothix C301-M-60 produced and sold by Spencer Kellogg Division of Textron, Inc.

Because of environmental considerations related to the flammability and toxicity of the organic solvents, attempts have been made to replace the alkyd or modified alkyd binders with water borne binders such as acrylic emulsions and water dilutable alkyds.

The organic solvent borne alkyds, gelled alkyds, water borne alkyds and acrylic emulsions are relatively expensive. Because they have to be used at fairly high concentrations of 5 to 20 pounds per gallon of stain to reduce pigment settling, they represent an undesirably high cost factor in the stain.

As the need and popularity, due to ease of use, of the water borne coatings has increased, a number of special additives have been developed for use in water borne coatings. These additives include special driers that are stable in aqueous solutions, surface active agents and bubble breakers. Additionally, a variety of water soluble thickeners have been developed. Many of these thickeners when used in small concentrations of 0.1-3 weight percent give high viscosities up to a gelled structure when dissolved in water. These thickeners are not film formers by themselves and have therefore not been considered as replacement for the conventional film forming binders, such as alkyds, modified alkyds, water borne alkyds and polyvinyl or acrylic emulsions.

In recent years several water borne stains have appeared on the market. These are based upon the use of acrylic or polyvinyl acetate emulsions. These emulsions are primarily designed to act as binders, have inherently low viscosities (1-8 poises) and wipe on stains based upon them show substantial pigment settling. To avoid pigment settling, small amounts of synthetic or natural thickeners are often incorporated. The amount of thickener used is generally kept at a very low level as it detracts from the performance characteristics of dried films. Because they do not form films, thickeners by themselves are not used for formulating clear or pigmented coatings. Thus wiping stains, the type of composition to which the present invention is directed, have traditionally been formulated as an extension of the coating formulations.

OBJECTS OF THE PRESENT INVENTION

One object of this invention is to produce a stain that can be applied to bare wood and then wiped off leaving the wood pores filled with pigment. By proper choice of the pigment or pigments in the stain, the color of the wood can be changed; for example, pine may be given a walnut wood appearance.

A further object of this invention is to produce a stain which is water miscible in its wet state, so that any implements, such as rags and brushes, used for its application can be readily washed with water after use.

A further object of this invention is to produce a stain that, after application of the stain but before wiping, stays wet for a substantial time, say 20-60 minutes, so relatively large areas such as doors and table tops can be treated without leaving uneven application marks.

A further object of this invention is to produce a stain which, after application onto wood and then wiping, upon drying becomes relatively water and organic solvent resistant, so that the stained surface can be finished with an overcoat of a clear varnish or lacquer. Such a varnish may be borne by an organic solvent or water, or a mixture of both.

A further object of this invention is to produce a stain which, after application on wood followed by wiping, dries in a relatively short time of about 1-4 hours so that the wood treated with it can be sanded or overcoated with a varnish or lacquer within a reasonable time.

A further object of this invention is to produce a stain that is high in viscosity, so that the pigment used does not settle even on prolonged storage of 6-24 months, and only a minimal amount of stirring is needed to get a uniform suspension of the pigment.

SUMMARY OF THE INVENTION

It has been surprisingly found that stains of the type mentioned above need little or no binder. The reason for this is that these stains are used mostly for absorption by the wood to enhance the grain structure of wood or impart a special color, or both. Wood treated with such stains is always overcoated with a protective layer of a clear finish. It has been found that what is needed is that the stain after application, wiping and drying not be marred by the later applied protective layer, and this does not require the addition of large quantities of a film forming binder.

Thus, the present invention provides a water borne wood stain resistant to pigment settling prior to use comprising: a dispersed pigment for staining the wood, water and sufficient nonfilm forming water thickener to raise the solution viscosity to a level to substantially reduce pigment settling.

Most water borne thickeners develop a degree of water and organic solvent resistance upon drying. This water and organic solvent resistance is adequate to resist marring by the application of the protective overcoat of a clear finish. Most of the organic solvent, or the organic solvent-water mixture or water of the stain evaporate in 30-240 minutes, and the dried stain on overcoating with a varnish resists any attack after drying for such a short time.

Stains made with pigment and a thickener have a wet appearance when freshly applied and wiped. However, as these stains dry they get an overall whitish cast. Upon applying an overcoat of a lacquer or varnish, the original wet look reappears. This sequence has a practical disadvantage, as it becomes impossible by looking at the dried stained wood with its whitish cast to tell what the final finish will look like. It was found that this disadvantage can be easily overcome by adding a small quantity of about 2–10, preferably 5–8, weight percent of a film forming resin, preferably a slow drying alkyd, or oil or a water based resin to the stain. The alkyd could be an organic solvent borne alkyd or a water dilutable alkyd. Any solvent based alkyd that is normally stable when emulsified in water such as isophthalic alkyds, for example Super Beckosol 98-970 made by Reichhold Chemicals, Inc., or an acrylic water dispersed polymer such as AC-64 made by Rohm and Haas Company, or a water solution of a modified polysaccharide polymer such as JK270 made by Lorcon Chemicals, Inc. of Dorval, Quebec, Canada, may be used for this purpose.

Accordingly, in the preferred embodiment the present compositions include a minor amount of a film forming resin sufficient to retain the wet appearance of the stain after drying of the thickener. Accordingly, preferred compositions of the present invention contain the following components in approximate relative weight proportions:

| Component | Amount |
| --- | --- |
| Film forming resin | 5–8 |
| Dispersed pigment | 5–15 |
| Water thickener | 0.5–2 |
| Water | 89.5–75 |

DESCRIPTION OF THE PREFERRED EMBODIMENT

One key element in the present formulations is the incorporation of a thickener. Thickeners are additives which, when added to water in small amounts, raise its viscosity by a relatively large amount. Typically, the viscosity of water will change from one poise to about 20–100 poises on the addition of 0.5–4 weight percent based upon solids content of thickener used.

Suitable thickeners are commonly classified as "Natural" or "Synthetic". Examples of natural thickeners are casein and alginates. Examples of synthetic thickeners are "Natrosol" (a cellulosic thickener manufactured by Hercules Inc.), polyvinyl alcohols and acrylic thickeners such as QR-708 and CPE-15 manufactured by Rohm and Haas Company. Of these, the acrylic thickeners are preferred as they are not prone to bacterial or fungal attack on storage. The natural or synthetic cellulosic thickeners may also be used. However, when they are used bactericides and fungicides should preferably be added.

The unique thickening properties of thickeners are due to their ability to adsorb large quantities of water leading to a great deal of swelling. In the case of acrylic thickeners this property is achieved by incorporating an acidic monomer, such as methacrylic acid, as a copolymer during the synthesis. The finished polymer when partially or fully neutralized swells and takes up water. The neutralizing agents used can be inorganic, such as sodium hydroxide or ammonia, or inorganic, such as amines. The extent of thickening achieved can be further controlled by the addition of solvents such as alcohols, for example methanol, ethanol and butanol, or ketones such as acetone, methylethyl ketone, or other solvents such as Propasol, butyl Cellosolve, butyl carbitol. Other solvents, where useable, are generally mentioned in the trade literature supplied by the manufacturer. Additional control of the extent of thickening can be obtained by using different concentrations of the thickener, higher concentrations giving a greater extent of thickening.

Some acrylates, which are used primarily for other applications such as floor finishes, can also act as thickeners if used in the correct concentration, pH and with proper water-solvent combinations. Examples of such acrylic polymers are WS-24, Rheoplex B-505 made by Rohm and Haas Company.

It is the use of the water thickener in relatively higher amounts (0.5–4% weight) than has heretofore been used in water borne stains that primarily distinguishes the present formulations. The use of a smaller amount of film forming resin or binder in the preferred formulations is another important difference. These differences between the preferred new compositions of this invention and the presently marketed conventional stains is best seen in the following table in which the components listed are by weight:

|  | Conventional (Water Based) | Conventional (Solvent Based) | Present Invention |
| --- | --- | --- | --- |
| Film forming resin | 25–35 | 25–35 | 5–8 |
| Pigment | 10–15 | 10–15 | 5–15 |
| Thickener (water) | 0.1–0.2 |  | 0.5–4 |
| Water | 64.9–49.8 |  | 89.5–73 |
| Thickener (solvent)* |  | 0.2–1.0 |  |
| Organic solvent |  | 64.8–49 |  |
|  | 100 | 100 | 100 |

*Bentone (organically modified clay) or other suspending agent

The following examples will illustrate formulations of the present invention in comparison with conventional stains. Each example and the point illustrated thereby is as follows.

Example 1 illustrates a conventional wood stain which is solvent based and uses a conventional alkyd. It exhibits pigment settlement on storage.

Example 2 illustrates a conventional gelled wood stain which is solvent based and uses a gelled alkyd. It exhibits no pigment settlement on storage.

Example 3 illustrates a water borne gelled wood stain, the gelled structure being obtained by using 1–4% by weight of a water borne thickener. It exhibits no pigment settling, but the color of wood stained with it before and after drying is different.

Example 4(a) illustrates a water borne gelled wood stain, the gelled structure obtained by using 1–4% by weight of a water borne thickener, modified with the addition of a water or solvent based film forming resin.

Example 4(b) illustrates a water borne gelled wood stain, the gelled structure obtained by using 1–4% by weight of a water borne thickener, modified with the addition of a water or solvent based film forming resin and a wetting agent.

Example 5 compares the open time of solvent based (Examples 1 and 2) and water borne (Examples 3 and 4) stains.

In Examples 3, 4 and 6 the components are listed in the order in which they are usually mixed, although this is not a requirement and may be changed for various reasons, including the type of mixing or dispersing equipment being used.

EXAMPLE 1

| CONVENTIONAL STAIN | | |
|---|---|---|
| Material | Pounds | Gallons |
| Long oil alkyd | 278.44 | 36.25 |
| Pigments and extenders | 420.47 | 17.34 |
| Mineral spirits | 302.40 | 46.31 |
| Cobalt naphthenate, 6% | 2.27 | .28 |
| Zinc naphthenate, 18% | 1.89 | .20 |
| Calcium naphthenate, 4% | 2.13 | .27 |
| Anti-skinning agent | .79 | .10 |
| | 1008.39 | 100.75 |

EXAMPLE 2

| GELLED SOLVENT BASE STAIN | | |
|---|---|---|
| Material | Pounds | Gallons |
| Thixotropic alkyd (Kelthix C301-60M) | 243.94 | 31.88 |
| Long oil alkyd | 34.50 | 4.37 |
| Pigments and extenders | 420.47 | 17.34 |
| Mineral spirits | 301.40 | 46.26 |
| Cobalt naphthenate, 6% | 2.27 | .28 |
| Zinc naphthenate, 18% | 1.89 | .20 |
| Calcium naphthenate, 4% | 2.13 | .27 |
| Anti-skinning agent | .79 | .10 |
| | 1007.39 | 100.70 |

EXAMPLE 3

| GELLED WATER BASE STAIN WITH NO RESIN | | |
|---|---|---|
| Material | Pounds | Gallons |
| Water | 79.00 | 9.49 |
| Propasol P[1] | 11.83 | 1.61 |
| NH$_4$OH, 28% | .28 | .04 |
| Thickener, CPE-15 | 2.09 | .24 |
| NOPCO NDW[2] | 1.74 | .23 |
| Tamol 731[3] | 2.61 | .29 |
| Triton CE-10[4] | .87 | .10 |
| Ethylene Glycol | 13.05 | 1.41 |
| Pigments | 54.81 | 2.21 |
| Texanol[5] | 5.42 | .70 |
| Water | 677.58 | 81.64 |
| Propasol P | 7.80 | 1.06 |
| NH$_4$OH, 28% | 1.56 | .22 |
| Thickener, CPE-15 | 11.71 | 1.34 |
| NOPCO NDW | .44 | .06 |
| | 870.79 | 100.64 |

[1] trademark for n-propoxypropanol
[2] defoamer made by Napco Chemical Co.
[3] trademark for sodium salt of a carboxylated polyelectrolyte made by Rohm and Haas Company
[4] surfactant made by Rohm and Haas Company
[5] trademark for 2,2,4-trimethyl-1,3-pentanediol monoisobutyrate

EXAMPLE 4(a)

| GELLED WATER BASE STAIN WITHOUT WETTING AGENT | | |
|---|---|---|
| Material | Pounds | Gallons |
| Water | 79.00 | 9.49 |
| Propasol P | 11.83 | 1.61 |
| NH$_4$OH, 28% | .28 | .04 |
| Thickener, CPE-15 | 2.09 | .24 |
| NOPCO NDW | 1.74 | .23 |
| Ethylene Glycol | 13.05 | 1.41 |
| Pigments | 54.81 | 2.21 |
| Acrylic resin, AC-64 | 78.30 | 9.11 |
| Texanol | 5.42 | .70 |
| Water | 602.76 | 72.62 |

| GELLED WATER BASE STAIN WITHOUT WETTING AGENT | | |
|---|---|---|
| Material | Pounds | Gallons |
| Propasol P | 7.80 | 1.06 |
| NH$_4$OH, 28% | 1.56 | .22 |
| Thickener, CPE-15 | 11.71 | 1.34 |
| NOPCO NDW | .44 | .06 |
| | 870.79 | 100.34 |

EXAMPLE 4(b)

| GELLED WATER BASE STAIN WITH WETTING AGENT | | |
|---|---|---|
| Material | Pounds | Gallons |
| Water | 79.00 | 9.49 |
| Propasol P | 11.83 | 1.61 |
| NH$_4$OH, 28% | .28 | .04 |
| Thickener, CPE-15 | 2.09 | .24 |
| NOPCO NDW | 1.74 | .23 |
| Tamol 731 } Wetting agents | 2.61 | .29 |
| Triton CF-10 | .87 | .10 |
| Ethylene glycol | 13.05 | 1.41 |
| Pigments | 54.81 | 2.21 |
| Acrylic resin, AC-64 | 78.30 | 9.11 |
| Texanol | 5.42 | .70 |
| Water | 595.36 | 71.56 |
| Propasol P | 7.80 | 1.06 |
| NH$_4$OH, 28% | 1.56 | .22 |
| Thickener, CPE-15 | 11.71 | 1.34 |
| NOPCO NDW | .44 | .06 |
| | 866.87 | 99.67 |

EXAMPLE 5

Stains made according to the Examples 1, 2, 3, 4(a) and 4(b) were applied to a 2'×2' ash panel by brush. Portions of the coated panels were wiped with a rag at 15 minute intervals.

Panels coated with stains made according to Examples 1 2 and 3 could not be wiped after the first 30 minutes. However, stains made according to Examples 4(a) and 4(b) could be wiped even after 45 minutes. These results show that the addition of a small quantity of a resin binder to water based stains gives a considerably better "open time".

The wiped panels were allowed to air dry for one hour and then re-examined. Upon drying, panels coated with stains made according to the formulations of Examples 1, 2 and 4(b) looked normal. However, the panels coated with stain made according to the formulation of Example 3 had developed a whitish haze, and the panel coated with stain made according to the formulation of Example 4(a) did not stain the wood as well as the panel coated with stain made according to the formulation of Example 4(b), showing that the addition of the wetting agent helps wet pigments, with consequent better color development on the stained panels.

Wetting agents or surfactants are those materials which will lower the surface tension of the solvent system. Suitable examples of wetting agents are anionic emulsifying agents, such as sodium oleate, cationic emulsifying agents, such as lauryl ammonium acetate, and non-ionic emulsifying agents, such as glyceryl monolaurate. For further details on wetting agents see C. B. F. Young and K. N. Coons, *Surface Active Agents*, Chemical Publishing Co., 1945.

Generally an effective amount of a wetting agent will be about 0.5–3.0% by weight of the total formulation.

EXAMPLE 6

| GELLED WATER BASE STAIN WITH JK-270 | | |
| --- | --- | --- |
| Material | Pounds | Gallons |
| Water | 19.34 | 2.30 |
| Propasol P | 12.63 | 1.72 |
| NH4OH, 28% | .28 | .04 |
| Thickener, CPE-15 | 2.21 | .26 |
| NOPCO NDW | 1.86 | .25 |
| Tamol 731 | 2.79 | .31 |
| Triton CF-10 | .93 | .10 |
| Ethylene glycol | 23.40 | 2.52 |
| Pigments | 58.60 | 2.36 |
| Water | 662.56 | 79.65 |
| Propasol P | 12.96 | 1.76 |
| NH4OH, 28% | 3.97 | .56 |
| NOPCO NDW | .47 | .07 |
| JK-270 Resin | 61.38 | 6.26 |
| Thickener CPE-15 | 19.33 | 2.20 |
| | 882.71 | 100.36 |

What is claimed is:

1. A water borne wood stain resistant to pigment settling prior to use comprising: a dispersed pigment for staining wood, water and sufficient nonfilm forming water thickener to raise the solution viscosity to a level which creates a gelled structure in the stain to substantially reduce pigment settling.

2. A water borne wood stain in accordance with claim 1 and including a minor amount of film forming resin sufficient to retain the wet appearance of the stain after drying of said thickener.

3. A water borne wood stain in accordance with claim 2 wherein said thickener is present in about 0.5–4% by weight of the stain.

4. A water borne wood stain in accordance with claim 2 wherein said film forming resin is an aqueous dispersable resin.

5. A water borne wood stain in accordance with claim 2 wherein said film forming resin is an organic solvent soluble resin.

6. A water borne wood stain in accordance with claim 2 wherein the components are present in the following approximate relative parts by weight:

| Component | Amount |
| --- | --- |
| Film forming resin | 5–8 |
| Pigment | 5–15 |
| Water thickener | 0.5–2 |
| Water | 89.5–75 |

7. A water borne wood stain in accordance with claim 6 and including a wetting agent for said pigment to enhance color development in the wood.

8. A water borne wood stain in accordance with claim 6 wherein said film forming resin is an acrylic resin.

9. A method for staining bare wood comprising: applying a composition in accordance with claim 1 to said wood, spreading the composition over the wood surface and removing excess of the composition from the wood surface.

10. A method for staining bare wood comprising: applying a composition in accordance with claim 8 to said wood, spreading the composition over the wood surface and removing excess of the composition from the wood surface.

* * * * *